United States Patent Office 2,725,373
Patented Nov. 29, 1955

2,725,373

ELASTOMERIC POLYMERS

Richard J. Reynolds, Wilmington, Del., assignor to E. I. du Pont de Nemours and Company, Wilmington, Del., a corporation of Delaware No Drawing. Application May 5, 1953,
Serial No. 353,225

4 Claims. (Cl. 260—92.3)

This invention relates to the preparation of new elastomeric polymers of 2,3-dichloro-1,3-butadiene, and more particularly to new bromine containing polymers of 2,3-dichloro-1,3-butadiene which are particularly useful as adhesives.

When 2,3-dichloro-1,3-butadiene is polymerized, the product normally obtained is practically insoluble and non-thermoplastic. Since solubility and plasticity are necessary properties of elastomers for many uses, it will be apparent that a method of treating this butadiene polymer to produce an elastomeric material having new and valuable properties is desirable.

It is therefore an object of this invention to provide a relatively simple and economical method for converting polymeric 2,3-dichloro-1,3-butadiene to a polymer having desirable elastomeric properties. Another object is to provide a solvent soluble thermoplastic elastomer which, when used as an adhesive for bonding other elastomers to each other or to other surfaces including metals, provides a bond at least as strong as the elastomer to be bonded.

I have found that when bromine is introduced into polymerized 2,3-dichloro-1,3-butadiene until the percentage of bromine on a weight basis is between 16.0 and 27%, the resulting product is a thermoplastic, rubber-like polymeric material soluble in a large variety of organic solvents, and is particularly effective as an adhesive for elastomeric materials. It is a solid plastic product which can be worked on the usual rubber mill like rubber and can be cured by heating to a relatively hard product. It can be deposited from solutions as a coating composition which on curing forms a relatively hard film, and can be blended with other elastomers to produce rubber-like materials with modified characteristics. It can be compounded with the usual rubber compounding agents such as pigments, fillers, antioxidants, etc.

The bromination of the 2,3-dichloro-1,3-butadiene polymer may be carried out in a solvent by means of free bromine, either alone or in the presence of an inorganic compound capable of combining with the hydrogen bromide (acid binding agent) formed in the reaction. It may be carried out by means of an organic amide or imide in which hydrogen attached to nitrogen has been replaced by bromine. These amides and imides may be derived from either carboxylic or sulphonic acids, such as N-bromo-phthalimide, -succinimide, -toluenesulfonimide, -acetamide, -benzamide, etc. Either type of bromination is assisted by catalysts which may be light, heat such as produced by infra-red rays, or hydroperoxide or peroxide catalysts. The large quantity of hydrogen bromide evolved during the bromination indicates that the bromine reacts by substitution on the methylene group rather than by addition to the double bond. This is usually referred to as allylic bromination.

The solvents which may be used in the bromination should preferably dissolve at least 5% by weight of the polymer at or below the boiling point of the solvent and should themselves be resistant to bromination. The preferred solvents include the chlorinated aliphatic and aromatic hydrocarbons such as chloroform, carbon tetrachloride, tetrachloroethane, chlorobenzene, dichlorobenzene and the like, and/or other non-chlorinated organic liquids such as benzene which are solvents for the polymer but are themselves resistant to bromination under the conditions of reaction.

In brominating with N-bromosuccinimide and similar agents, an excess of agent is used over that calculated to give the desired bromine content even when catalysts are employed. In brominating with free bromine with light or a peroxide or hydroperoxide catalyst, the reaction is usually practically quantitative.

The following examples are given to illustrate the invention. The parts used are by weight, unless otherwise specified.

Example 1

The following example is given to show a suitable method of preparing 2,3-dichloro-1,3-butadiene, although it is to be understood that the polymer may be prepared by any known means and is not limited to emulsion polymerization.

| | |
|---|---|
| Distilled water | gm.. 9600 |
| Potassium persulfate | gm.. 15 |
| Sodium bisulfite | gm.. 3.0 |
| Sodium hydroxide | gm.. 30 |
| A fatty alcohol sulfate sodium salt | gm.. 120 |
| Xylene | gm.. 750 |
| 2,3-dichloro-1,3-butadiene | gm.. 3000 |

The ingredients were emulsified in the usual fashion by high speed agitation at 20° C., and the resultant heat of reaction allowed to carry the temperature to between 40° and 45° C., after which time the polymerization was allowed to proceed at 40° C. for one hour. The polymer was coagulated as a fine powder by pouring the latex into 15 gallons of well stirred methanol. After filtration, the polymer was slurried in methanol, refiltered and dried for 20 hours in a vacuum oven at 50° C. The conversion, based on monomer used, was 89%. The fine white powder was insoluble in toluene at room temperature, and although it gave 5% solutions in hot benzene, toluene, carbon tetrachloride and other non-polar solvents, they quickly gelled on cooling to room temperature. It was necessary to heat 0.1% xylene solutions to high temperatures in order to determine the intrinsic viscosity. The intrinsic viscosity of a 0.1% xylene solution of this polymer at 74.0° was 0.84. Attempts to cast films of this polymer from its hot solutions were unsuccessful, resulting in the deposition of a brittle, flaky, opaque residue. X-ray diffraction diagrams of these residues using the $K\alpha$ X-ray emission spectra of copper as an X-ray source demonstrated a pronounced crystalline peak at the Bragg angle of $2\theta = 18.6°$. The polymer was, in fact, almost devoid of rubber-like properties, and could not successfully be milled on a conventional rubber mill below 100°. When milled, the polymer was always obtained as a highly brittle sheet which flaked off of the mill and was easily broken. The incorporation of relatively large amounts of mercaptan into the above standard recipe had an almost imperceptible effect on its solubility.

Examples 2, 3 and 4

The amounts of dichlorobutadiene polymer as given in the following table, prepared as described in Example 1, were dissolved in 540 ml. of boiling benzene and treated with an amount of N-bromosuccinimide as indicated in the table. This mixture was agitated while exposed to a 375 watt infra-red lamp at a distance of about one foot until tests with starch-potassium iodide paper, which showed the presence of unchanged bromosuccinimide by turning blue, indicated that the reaction was complete. After irradiation, the polymer was coagulated with methanol, washed thoroughly with cold water on a conventional wash mill for elastomers, blended with 2%, based on the theoretical weight of brominated polymer, of phenyl-alpha-naphthylamine antioxidant, and dried by milling at 50° C.

| Example | Polymer (grams) | N-bromo-succinimide (grams) | Yield, grams | Wt. Percent Bromine | Solubility |
|---|---|---|---|---|---|
| 2 | 24.6 | 17.8 | 33 | 21.2 | 50+ |
| 3 | 24.6 | 21.4 | 37 | 22.6 | 50+ |
| 4 | 24.6 | 25.2 | 35 | 24.0 | 50+ |

In the above table, the solubility is indicated as the grams of polymer which were dissolved in 100 grams of toluene at room temperature. In these examples 50 grams were found to be completely soluble and higher concentrations were not determined. + Means that this amount was completely soluble.

*Examples 5 and 6*

Similar results were also obtained when the bromination was carried out on polymers which were prepared by emulsion polymerization, using mercaptan modifiers. When Example 1 was modified by the inclusion of 2% technical lauryl mercaptan, based on the dichlorobutadiene, a polymerization cycle of one hour and ten minutes at 40° C. resulted in a 94% conversion.

Two master batches of the above polymer in benzene solution were prepared by dissolving 123 grams of the dichlorobutadiene polymer in 2400 ml. of gently refluxing benzene. Bromine, as indicated below, was added in varying proportions to each master batch and successive portions of the resulting master batch were drawn off into a reaction vessel, and the reaction with bromine completed by irradiation with a 375 watt infra-red lamp while being vigorously agitated. The size of the portion (about 500 ml.) was taken such that the total time required for the dissipation of the bromine color during irradiation did not exceed 10 minutes, excessive irradiation being detrimental to the resulting polymer. The radiation from the lamp kept the solution gently refluxing. In each case, a copious evolution of hydrogen bromide occurred during the reaction. Upon dissipation of the bromine color, the solution of brominated polymer was drawn from the reaction zone into a coagulating bath containing sufficient aqueous sodium carbonate in methanol to neutralize the free hydrogen bromide present. The next batch to be brominated was then introduced into the reaction zone and the process repeated until the entire master batch had been brominated. The coagulated brominated polymers were washed on the rubber mill with methanol, blown partially dry with air, and taken up in sufficient toluene to give a 20% solids solution at room temperature. The toluene cements were stabilized with 2% phenyl-beta-naphthylamine based on the theoretical weight of the brominated polymer.

| Example | Gr. Polymer | Gr. Bromine | Wt. Percent Bromine Found by Analysis of Polymer |
|---|---|---|---|
| 5 | 123 | 53.3 | 16.6 |
| 6 | 123 | 68.6 | 19.7 |

Equivalent results were obtained when 10% of either benzoyl peroxide, di-tertiary-butylperoxide or tertiary-butyl-hydroperoxide (based on the weight of bromine used) were used as bromination catalysts, in refluxing carbon tetrachloride solvent in the place of actinic light. Reaction times as great as thirty hours, using these catalysts in indifferent solvents which act as good chain transfer agents, such as carbon tetrachloride, are not detrimental to the resulting polymers. Brominations with these catalysts are further accelerated by use of dispersed sodium acetate in the reaction medium. Due to the tendency of certain hydroperoxides to decompose with violence under these reaction conditions, cumene hydroperoxide being especially bad, it is preferable when using hydroperoxide catalysts to introduce the catalyst in portions diluted with carbon tetrachloride during the bromination in order to obtain a smooth and readily controlled reaction.

*Example 7*

A dichlorobutadiene polymer, 123 grams, similar to that of Example 6, was dissolved in 1500 ml. of carbon tetrachloride by agitating at gentle reflux in a flask which was painted black to eliminate any catalytic effect due to incident light during the subsequent bromination. When the polymer was dissolved, 53.3 grams of bromine were added and the mixture agitated vigorously at reflux while adding a mixture of 10.0 ml. of 60% tertiarybutyl-hydroperoxide and 40 ml. of carbon tetrachloride in portions so that two hours were required to complete the addition. A copious evolution of hydrogen bromide resulted and the bromination was complete in two hours and seventeen minutes as evidenced by the colorless drops of condensate issuing from the condenser. The reaction mixture was cooled to room temperature, treated with 22 ml. of concentrated ammonium hydroixde in 200 ml. of distilled water, and agitated a few minutes to disperse the ammonia and neutralize any excess acid not evolved during the reaction. The polymer was coagulated by slowly adding the lemon yellow dispersion to 3 liters of methanol while agitating. The wet polymer curd was finally washed on a chromium plated wash mill with an additional liter of methanol, partially blown dry with air and dried further for 6 hours at 50° C. in a vacuum oven to give 174 grams of a partially dry polymer which was dissolved, together with 2.8 grams of 2,2'-methylene-bis-6-tertiarybutyl-p-cresol antioxidant, in sufficient toluene to give a 20% by weight polymer solution at room temperature. A film cast from this solution and dried completely gave an analysis of 18.12% bromine and 45.61% chlorine.

Equivalent results were obtained in carbon tetrachloride solution with tertiary-butylhydroperoxide, di-tertiary-butyl-peroxide and benzoyl peroxide in the presence or absence of light. Carbon tetrachloride is a preferred solvent when these catalysts are used. The rate of bromination in carbon tetrachloride is greatly influenced by the rate of addition of catalyst and the rate of removal of hydrogen bromide, which inhibits the bromination under these conditions, from the reaction mixture. Thus, those reactions which were carried out in the presence of a dispersed inorganic acid acceptor such as anhydrous sodium acetate or potassium or calcium carbonate or which were agitated and/or refluxed more vigorously proceeded at a much greater rate.

*Examples 8 to 11, inclusive*

The 2,3-dichloro-1,3-butadiene polymer employed in these examples is the product prepared by the process more particularly described in Examples 5 and 6.

The polymer, in amounts given in the following table, was dissolved in the carbon tetrachloride by agitating at reflux for several minutes. The bromine was then added and heating at reflux was continued with agitation for a period of from 4 to 5 hours, during which period the catalyst was added. When the bromination was completed as evidenced by colorless drops of condensate returned from the reflux condenser, the brominated polymers were isolated as toluene or xylene solutions by distilling off about 80% of the carbon tetrachloride at reduced pressure of about 100 mm., and as the remaining carbon tetrachloride was removed it was simultaneously replaced with sufficient amount of toluene or xylene to give a solution containing approximately 20% dissolved polymer solids. These solutions were stabilized by the addition of 2%, based on the theoretical weight of the brominated polymer, of 2,6-di-tertiarybutyl-p-cresol antioxidant. The resulting solvent solutions of the brominated polymer remained completely fluid and completely free of any solid material on standing at room temperature.

Any variations in the procedure above outlined for Examples 8 to 11, inclusive, are given as footnotes following the table in which the various amounts of ingredients employed, and bromine analyses of the products, are given. In all cases the yield was substantially quantitative since all of the 2,3-dichloro-1,3-butadiene polymer was recovered after bromination.

| Ex. | Poly.-DCD (grams) | CCl$_4$ (grams) | Br$_2$ (grams) | Catalyst[b] (grams) | Catalyst Addition Time, hrs. | Polymer Analysis, Percent Br[c] |
|---|---|---|---|---|---|---|
| 8 | 123 | 2,390 | 52.2 | 3.2 | 4.0 | 16.0 |
| 9 | 165 | 1,486 | 71.6 | 6.5 | 2.0 | 18.6 |
| 10 | 123 | 2,337 | 56.2 | 5.5 | (a) | 20.3 |
| 11 | 123 | 2,280 | 76.7 | 12.7 | 3.0 | 26.4 |

[a] In Example 10, the catalyst was added after the 2,3-dichloro-1,3-butadiene polymer had been dissolved in the carbon tetrachloride. The bromine was then added dropwise. In the other examples listed in the table, the catalyst was gradually added over the period indicated.

[b] The catalyst employed was a commercial product containing 60% tertiarybutyl hydroperoxide obtained from the Lucidol Division of the Novadel-Agene Corp., Buffalo, N. Y.

[c] The bromine analysis was made on dried films of the brominated polymer cast from the solvent solutions and corrected for the amount of antioxidant present.

In Example 9, using the smaller amount of carbon tetrachloride, the polymer at first did not completely dissolve and bromination was carried out in the swollen gel which gradually became a solution during the progress of the bromination. The polymer was isolated as the xylene solution, while in the other examples in the above table toluene was employed.

In Example 10, no antioxidant was added. The resulting solution tended to liberate hydrogen bromide on standing, although this did not appear to adversely affect the stability of the cement with regard to gellation.

The allylically brominated dichlorobutadiene polymers prepared according to this invention, containing 16% to 27% of bromine by weight, when used in combination with either chlorinated rubber or chlorinated neoprene are so effective in bonding elastomers to metal that it is ordinarily quite impossible to separate the elastometer from the bonded article without a resulting rupture or splitting of the elastomer stock used in the test. The bonds available from these adhesives are further characterized by their great strength at high temperatures which is an advantage in that the bonded article may be ejected from a hot press or mold without a resulting rupture of the bond.

These adhesives represent a definite improvement over those of the prior art, inasmuch as they serve to bond a variety of different elastomers to steel with apparently equal success without any further modification. In addition, 20% solids cements of these polymers in typical non-polar organic solvents are stable for long periods of time (in excess of six months), and may be used after this time without any apparent loss in effectiveness. Another great advantage, not possessed by present commercial adhesives, is that they are effective in bonding rubber stocks having a wide range of curing rates.

Whereas a variety of different adhesives have heretofore been necessary to bond different elastomers such as rubber, neoprene or Buna to steel, iron, and other metals such as aluminum, brass, stainless steel, etc., it is now possible to form excellent bonds of these elastomers to metals with the polymer of the present invention. In direct contrast to some of the adhesives of the prior art, it is not necessary to add other ingredients such as curing agents, accelerators, fillers or pigments to cements of the polymers of this invention in order to develop maximum bond strength. Since the use of such ingredients is undesirable in view of the fact that it is troublesome to keep these ingredients well dispersed in order to avoid a high percentage of rejects, and since the use of these ingredients often causes premature curing of the dispersed or dissolved polymer used and subsequent low "pot life," and since the use of these ingredients often leads to an overcuring of the elastomer to be bonded with subsequent loss in bond strength due to failure of the weakened elastomer stock, the adhesives formulated from the polymer of the present invention represent a considerable improvement and advance in the art.

The solvent solutions of the brominated polymer of 2,3-dichloro-1,3-butadiene containing from 16% to 27% by weight of bromine exhibit new and surprising adhesive properties when mixed with or used in conjunction with chlorinated rubber, chlorinated polychloroprene (neoprene) or other chlorinated elastomers.

The introduction of bromine into the polymer of a substantially pure 2,3-dichloro-1,3-butadiene while increasing the solubility of the polymer, imparts thereto adhesive properties not exhibited by the same polymer after the introduction of further chlorine. The prior art, which employs the 2,3-dichloro-1,3-butadiene polymers as adhesives, has indicated that certain isomers or other impurities must be present to obtain satisfactory adhesive properties, and by comparisons with the brominated product of the present invention, this conclusion has been substantiated. For example, where a product of the present invention containing from 18% to 19% by weight of bromine is tested under identical conditions with a chlorinated 2,3-dichloro-1,3-butadiene polymer containing 10.2% of chlorine, both employed as 20% solvent solutions each mixed with an equal amount of chlorinated rubber, the former is found to be an exceptionally effective adhesive in bonding rubber to metal, whereas the latter (the chloro product) exhibits substantially no adhesive properties.

In making these tests the unvulcanized rubber stock employed was one containing 50 parts of E. P. C. carbon black per 100 parts of smoked sheet, and the test was made by the butt-joint ASTM method D429–47T, with the exception that steel buttons were employed having a one square inch surface instead of the two square inch surface prescribed by the ASTM method, so that the pounds per square inch could be measured directly. The bonded assemblies after being cured in a plunger mold for 30 minutes at 150° C. were tested to destruction by pulling in opposite directions at the rate of two inches per minute in a Tinius Olsen Tensile Testing Machine. The bromine-containing polymer gave a test of from 1050 to 1300 pounds per square inch, and the failure was in the rubber stock and not in the bond, whereas the chlorinated product failed at the bond before any appreciable tension could be applied.

This application is a continuation-in-part of co-pending application Serial No. 292,729 filed June 10, 1952, which has been abandoned.

I claim:

1. An allylically brominated 2,3-dichloro-1,3-butadiene polymer containing from 16% to 27% of bromine.

2. A process for preparing the polymer of claim 1 in which the 2,3-dichloro-1,3-butadiene polymer is substantially dissolved in an inert organic solvent and heated with a brominating agent in the presence of a catalyst until from 16% to 27% of bromine is introduced into the polymer.

3. A process for preparing the product of claim 1 in which the 2,3-dichloro-1,3-butadiene polymer is dissolved in carbon tetrachloride and heated with a brominating agent of the class consisting of N-bromo-organic amides and N-bromo-organic imides in the presence of a bromination catalyst.

4. A process for preparing the product of claim 1 in which the 2,3-dichloro-1,3-butadiene polymer is dissolved in carbon tetrachloride and heated with bromine, in the presence of a bromination catalyst.

No references cited.